United States Patent
Ruan (10) Patent No.: US 11,847,042 B2
(45) Date of Patent: Dec. 19, 2023

(54) AUTOMATIC ADJUSTMENT OF A LOGGING LEVEL OF AN ELECTRONIC DEVICE

(71) Applicant: ARRIS Enterprises LLC, Suwanee, GA (US)

(72) Inventor: Rongbin Ruan, Guangdong (CN)

(73) Assignee: ARRIS ENTERPRISES LLC, Suwanee, GA (US)

(*) Notice: Subject to any disclaimer, the term of this patent is extended or adjusted under 35 U.S.C. 154(b) by 401 days.

(21) Appl. No.: 17/291,392

(22) PCT Filed: May 19, 2020

(86) PCT No.: PCT/CN2020/090970
§ 371 (c)(1),
(2) Date: May 5, 2021

(87) PCT Pub. No.: WO2021/232217
PCT Pub. Date: Nov. 25, 2021

(65) Prior Publication Data
US 2022/0308982 A1    Sep. 29, 2022

(51) Int. Cl.
*G06F 11/00* (2006.01)
*G06F 11/36* (2006.01)

(52) U.S. Cl.
CPC ........ *G06F 11/366* (2013.01); *G06F 11/3664* (2013.01)

(58) Field of Classification Search
CPC .............. G06F 11/366; G06F 11/3664; G06F 11/3072; G06F 11/3409; G06F 11/3476; G06F 11/0781; G06F 11/0766
See application file for complete search history.

(56) References Cited

U.S. PATENT DOCUMENTS

| | | | | |
|---|---|---|---|---|
| 9,529,694 | B2* | 12/2016 | Srivastava | .......... G06F 11/3636 |
| 2014/0279918 | A1 | 9/2014 | Han | |
| 2020/0356433 | A1* | 11/2020 | Kumar | ................ G06F 11/0709 |

FOREIGN PATENT DOCUMENTS

| | | |
|---|---|---|
| CN | 104580310 | 4/2015 |
| CN | 106484593 | 3/2017 |
| CN | 111145382 | 5/2020 |

OTHER PUBLICATIONS

Notification of Transmittal of the International Search Report and the Written Opinion of the International Searching Authority dated Feb. 20, 2021 in International (PCT) Application No. PCT/CN2020/090970.

* cited by examiner

*Primary Examiner* — Marc Duncan
(74) *Attorney, Agent, or Firm* — Wenderoth, Lind & Ponack, L.L.P.

(57) ABSTRACT

An apparatus, method, and computer-readable recording medium for automatically adjusting a logging level for an electronic device. The electronic device includes a plurality of software modules, each software module controlling functions of the electronic device. Each of a plurality of failure events are associated in advance with one or more of the software modules. A current event is detected on the electronic device that corresponds to a matching failure event of the plurality of failure events. A predetermined logging level is automatically enabled for the one or more of the software modules associated with the matching failure event at the time of the detected current event. Log messages are captured at the predetermined logging level for the one or more of the software modules for which the predetermined logging level has been automatically enabled. The predetermined logging level is automatically disabled when the current event has ended.

20 Claims, 4 Drawing Sheets

| FAILURE EVENTS | RELATED MODULES |
|---|---|
| SOFTWARE UPGRADE FAILURE - 57 | SOFTWARE UPGRADE MODULE - 51 |
| MTA IP ADDRESS PROVISIONING FAILURE - 58 | DHCP MODULE - 52 |
| MTA CONFIGURATION FILE REJECTION - 59 | CONFIGURATION FILE PARSER MODULE - 54 |
| MTA REGISTRATION FAILURE - 60 | SIP AND DNS MODULES - 53 and 55 |
| CALL FAILURE - 61 | SIP, CALL-PROCESS, DNS MODULES - 53, 56 and 55 |

AUTOMATIC ADJUSTMENT OF A LOGGING LEVEL OF AN ELECTRONIC DEVICE

TECHNICAL FIELD

The subject matter of the present disclosure relates generally to automatic adjustment of a logging level of an electronic device.

BACKGROUND

The collection and analyzing of event log data is an important part of managing a computer network and system as well as managing the individual electronic devices connected to the computer network and system. An event log is a record of activities taking place on a computer network or within a device and it provides performance and troubleshooting information for each individual system and device on the network. Each individual system and device on a computer network generates such event logs that can be collected and analyzed for obtaining performance and troubleshooting information associated with the system and device.

Even small residential gateway computer networks can generate thousands of event log entries on a daily basis. Thus, it is important to control how much of such event log data is generated and captured in order to avoid unnecessary use of limited and costly Central Processing Unit (CPU) resources. In any event, too many log messages being captured and presented to a user can be cumbersome, distracting, or even at times annoying to the user.

This situation is addressed in the field by selecting between different logging levels. Logging levels provide a user with the ability to tailor the logging process so that log entries that match a user's specific needs or desired information can be easily obtained while avoiding the above-discussed problems associated with large amounts of log entries being generated and captured. For example, by switching to a lower logging level, less log entries will be generated and captured.

Some common logging levels in current use include FATAL, ERROR, WARNING, INFO, AND DEBUG. These particular levels are listed from lower logging levels to higher logging levels, namely with DEBUG being the highest logging level and FATAL being the lowest logging level of these examples. More particularly, if the ERROR logging level is set, events that occur at the ERROR or FATAL logging levels will be included in captured log data, while events at higher logging levels such as WARNING, INFO, and DEBUG will not be included in the captured log data. Accordingly, if the DEBUG logging level is set, events that occur at all of the above-noted DEBUG, INFO, WARNING, ERROR, and FATAL logging levels will be included in captured log data.

As a result, when DEBUG is set as the logging level, a particularly large amount of log entries will be captured as compared to a setting at a lower logging level. However, the DEBUG logging level is necessary in order to obtain the appropriate amount of data to perform most diagnostics and troubleshooting operations on computer networks and systems as well as on electronic devices connected to computer networks and systems.

When an error occurs in an electronic device connected to a computer network or system, for example, troubleshooting must be performed on the electronic device. The DEBUG logging level may be manually disabled as an initial default to avoid the above-discussed issue of too much log data being generated and captured, especially when it is not needed. Thus, in order to troubleshoot an error or failure in operation of an electronic device in conventional arrangements and methodologies, a user typically must first manually enable logging at the DEBUG logging level on the device. The user must then manually reproduce or re-create the situation that initially caused the error or failure to occur. These steps thus make it possible to then capture log data that can be analyzed to troubleshoot the device in order to determine the cause of the error and how to resolve the error.

However, this conventional arrangement and methodology has particular drawbacks. First, even a straightforward electronic device connected to a computer network or system can include a variety of modules, each of which has its own associated log entries. Thus, the above-discussed troubleshooting of the electronic device can involve capturing a large and often unwieldy amount of log data associated with all of the modules of the entire electronic device. This can be inefficient especially when the associated error or failure being analyzed only involves one or two of the modules of the electronic device.

Even further, this conventional arrangement and methodology is time consuming because it requires a user to manually perform the above-discussed steps of the user manually enabling logging at the DEBUG logging level, manually reproducing or re-creating the situation that initially caused the error to occur before the associated log data can be captured, and then manually detecting when the error has been resolved. Once the error has been resolved, the user must manually disable the DEBUG logging level to avoid a continued large amount of data capture at the DEBUG logging level when it is no longer needed.

Thus, it would be advantageous and an improvement over the relevant technology to provide an apparatus, system, method, and computer-readable recording medium capable of automatically adjusting, or setting, a logging level of an electronic device, such as, for example, a modem/gateway device, after a failure of at least some function of the electronic device has been detected. This automatic setting of a logging level would advantageously occur without requiring a user to manually set the logging level, manually reproduce or re-create the situation that caused the error, capture the log data, manually detect when an error is resolved, and then manually set the logging level back to its previous level. It would also be advantageous and an improvement over the relevant technology to provide these features without requiring a user to collect log data for an entire electronic device when log data associated with only particular portions of the electronic device need to be analyzed in troubleshooting the device.

SUMMARY

An aspect of the present disclosure provides an electronic device capable of automatically adjusting a logging level. The electronic device includes a hardware processor; and a non-transitory memory configured to store one or more programs including a plurality of software modules, each software module controlling functions of the electronic device. The hardware processor executes the one or more programs to: associate in advance each of a plurality of failure events with one or more of the software modules; detect a current event on the electronic device that corresponds to a matching failure event of the plurality of failure events; automatically enable a predetermined logging level for the one or more of the software modules associated with the matching failure event at the time of the detected current event; capture log messages for the one or more of the software modules for which the predetermined logging level has been automatically enabled; and automatically disable the predetermined logging level when it is detected that the current event has ended.

In an aspect of the present disclosure, the predetermined logging level is a DEBUG level. In an aspect of the present disclosure, the predetermined logging level is disabled as an initial default setting prior to the detected current event. In an aspect of the present disclosure, one or more default logging levels remain enabled regardless of whether the predetermined logging level is enabled or disabled.

In an aspect of the present disclosure, the electronic device is a modem/gateway device. In an aspect of the present disclosure, the modem/gateway device includes a Multimedia Adapter (MTA) and the plurality of software modules include one or more of a software upgrade module, a Dynamic Host Configuration Protocol (DHCP) module, a configuration file parser module, an Session Initiation Protocol (SIP) module, a Domain Name System (DNS) module, and a Call-Process module.

An aspect of the present disclosure provides a method for adjusting a logging level for an electronic device having a plurality of software modules, each software module controlling functions of the electronic device. The method includes associating in advance each of a plurality of failure events with one or more of the software modules and detecting a current event on the electronic device that corresponds to a matching failure event of the plurality of failure events.

The method also includes automatically enabling a predetermined logging level for the one or more of the software modules associated with the matching failure event at the time of the detected current event and capturing log messages for the one or more of the software modules for which the predetermined logging level has been automatically enabled. The method also includes automatically disabling the predetermined logging level when it is detected that the current event has ended.

An aspect described in the present disclosure provides a non-transitory computer-readable recording medium for automatically adjusting a logging level for an electronic device having a plurality of software modules, each software module controlling functions of the electronic device, the non-transitory computer-readable recording medium storing one or more programs which when executed by a hardware processor performs steps of the methods described above.

BRIEF DESCRIPTION OF THE DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded as merely examples. Accordingly, those of ordinary skill in the art will recognize that various changes and modifications of the examples described herein can be made without departing from the spirit and scope of the present disclosure. In addition, descriptions of well-known functions and constructions may be omitted for clarity and conciseness.

The terms and words used in the following description and claims are merely used to enable a clear and consistent understanding of the present disclosure. Accordingly, it should be apparent to those skilled in the art that the following description of the present disclosure is provided for illustration purposes only, and not for the purpose of limiting the present disclosure as defined by the appended claims and their equivalents.

Figure 1:
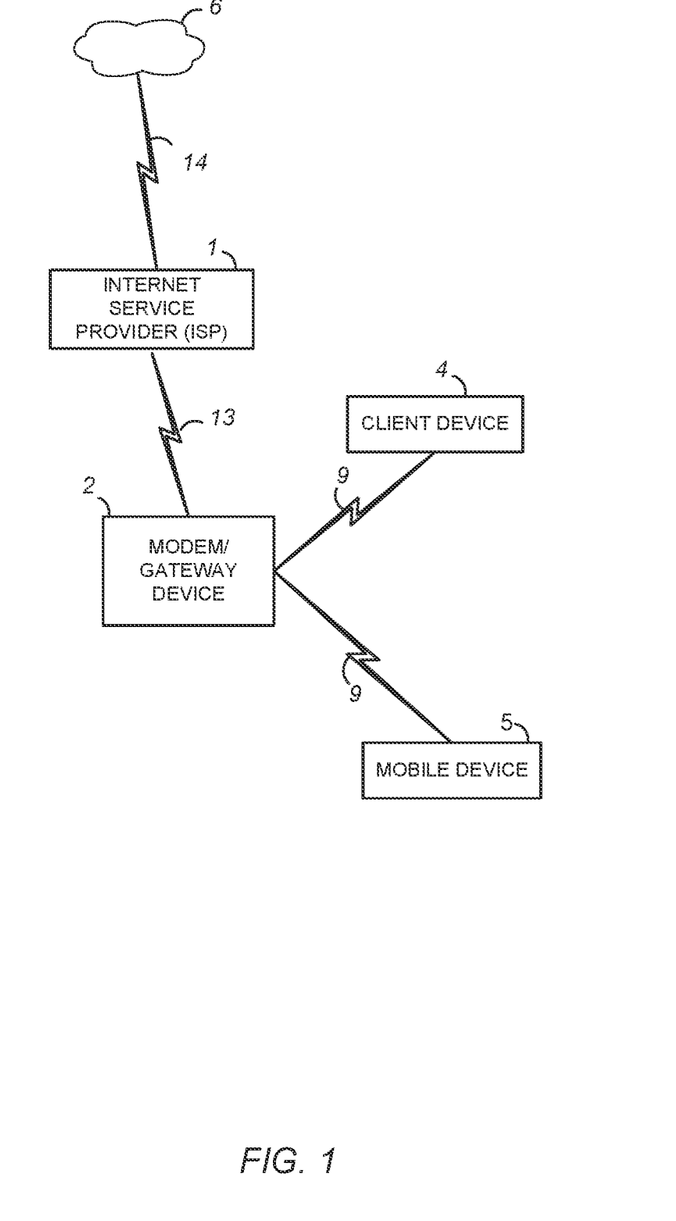
FIG. 1 is a schematic diagram of a system according to an embodiment of the present disclosure.

FIG. 1 is a schematic diagram of a system according to an embodiment of the present disclosure. As shown in FIG. 1, the main elements of the system includes a modem/gateway device 2 connected to the Internet 6 via an Internet Service Provider (ISP) 1 and also connected to different wireless or wired devices such as one or more client device 4 and one or more mobile device 5.

The system shown in FIG. 1 includes wireless devices or wired devices (e.g., one or more client device 4, and one or more mobile device 5) that may be connected in one or more wireless networks (e.g., private, guest, iControl, backhaul network, or Internet of things (IoT) networks) within the system. Additionally, there could be some overlap between devices in the different networks. That is, one or more network devices could be located in more than one network.

Starting from the top of FIG. 1, the ISP 1 can be, for example, a streaming video provider or any computer for connecting the gateway device 2 to the Internet 6. The connection 14 between the Internet 6 and the ISP 1 and the connection 13 between the ISP 1 and the gateway device 2 can be implemented using a wide area network (WAN), a virtual private network (VPN), metropolitan area networks (MANs), system area networks (SANs), a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example.

The connection 13 between the ISP 1 and the gateway device 2 can also be implemented using a DOCSIS network. The connection 13 can further include as some portion thereof a broadband mobile phone network connection, an optical network connection, or other similar connections. For example, the connection 13 can also be implemented using a fixed wireless connection that operates in accordance with, but is not limited to, 3rd Generation Partnership Project (3GPP) Long Term Evolution (LTE) or 5G protocols. It is also contemplated by the present disclosure that connection 13 is capable of providing connections between the gateway device 2 and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example.

The modem/gateway device 2 is an hardware electronic device that performs the function of a stand-alone cable modem or a combination modem and gateway device that combines the functions of a modem, an access point and/or a router for providing content received from the content provider 1 to network devices (e.g., one or more client device and one or more mobile device) in the system. It is also contemplated by the present disclosure that the modem/gateway device 2 can include the function of, but is not limited to, a Multimedia Adapter (MTA), and an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content.

The connection 9 between the modem/gateway device 2 and the one or more client device 4 and the one or more mobile device 5 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, or 6 GHz bands. Additionally, the connection 9 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 9 can include connections to a media over coax (MoCA) network. One or more of the connections 9 can also be a wired Ethernet connection.

The client devices 4 can be, for example, a hand-held computing device, a personal computer, an electronic tablet, a smart phone, smart speakers, an IoT device, an iControl device, or other similar wireless hand-held consumer electronic device capable of executing and displaying the content received through, for example, the modem/gateway device 2.

The mobile device 5 can be, for example, a hand-held computing device, a personal computer, a computer console, a smartphone, an electronic tablet, an e-reader, a personal digital assistant (PDA), or a portable music player with smart capabilities that is capable of connecting to the Internet, cellular networks, and interconnect with other devices via Wi-Fi and Bluetooth protocols.

Figure 2:
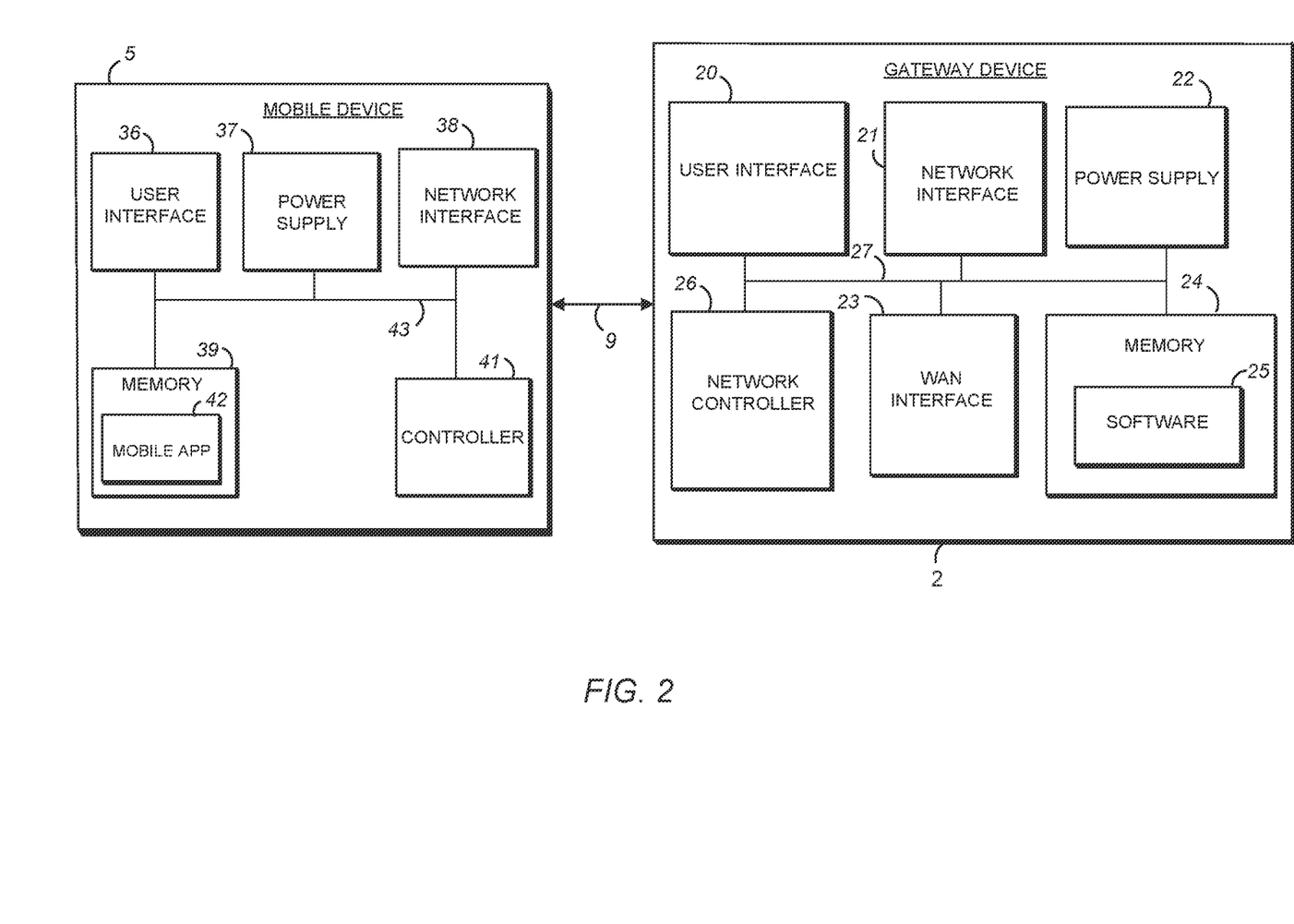
FIG. 2 is a more detailed schematic diagram of a modem/gateway device and mobile device according to an embodiment of the present disclosure.

A detailed description of the exemplary internal components of the modem/gateway device 2 and mobile device 5 shown in FIG. 1 will be provided in the discussion of FIG. 2. However, in general, it is contemplated by the present disclosure that the modem/gateway device 2, the one or more client device 4, and the one or more mobile device 5 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing devices in the modem/gateway device 2, the one or more client device 4, and the one or more mobile device 5 may be adapted to execute any operating system, including Linux, UNIX, Windows, MacOS, DOS, and ChromOS as well as virtual machines adapted to virtualize execution of a particular operating system, including customized and proprietary operating systems. The modem/gateway device 2, the client device 4, and mobile device 5 are further equipped with components to facilitate communication with other computing devices over the one or more network connections to local and wide area networks, wireless and wired networks, public and private networks, and any other communication network enabling communication in the system.

FIG. 2 illustrates a more detailed schematic diagram of an exemplary modem/gateway device 2 and the mobile device 5 in the system of FIG. 1 capable of automatically adjusting a logging level of an electronic device according to an embodiment of the present disclosure. Although FIGS. 1 and 2 only show one mobile device 5, it is contemplated by the present disclosure that there could be more than one mobile device 5 and the mobile device 5 in FIGS. 1 and 2 is meant to be representative of the one or more mobile devices 5 that can be implemented in the system. The same is true for the client device 4 shown in FIG. 1.

Now referring to FIG. 2 (e.g., from left to right), the mobile device 5 can be, for example, a hand-held computing device, a personal computer, a computer console, a smartphone, an electronic tablet, an e-reader, a personal digital assistant (PDA), or a portable music player with smart capabilities that is capable of connecting to the Internet, cellular networks, and interconnect with other devices via Wi-Fi and Bluetooth. As shown in FIG. 2, the mobile device 5 includes a user interface 36, a power supply 37, a network interface 38, a memory 39, a camera 40, and a controller 41. The user interface 36 includes, but is not limited to, one or more physical buttons, one or more virtual buttons, a keyboard, a keypad, a liquid crystal display (LCD), thin film transistor (TFT), light-emitting diode (LED), high definition (HD) or other similar display device including a display device having touch screen capabilities so as to allow interaction between a user and the mobile device 5. The power supply 37 supplies power to the internal components of the mobile device 5 through the internal bus 43. The power supply 37 includes a self-contained power source such as a battery pack with an interface to be powered through an electrical charger connected to an outlet (e.g., either directly or by way of another device). The power supply 37 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The network interface 38 includes various network cards, interfaces, and circuitry implemented in software and/or hardware to enable communications with the modem/gateway device 2 using the communication protocols in accordance with connection 9 (e.g., as described with reference to FIG. 1).

The memory 39 includes a single memory or one or more memories or memory locations that include, but are not limited to, a random access memory (RAM), dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), hard disk or any other various layers of memory hierarchy.

The memory 39 can be used to store any type of instructions and software including software or mobile applications 42 associated with algorithms, processes, or operations for controlling the general functions and operations of the mobile device 5 for automatically adjusting a logging level of a modem/gateway device 2 in accordance with the embodiments described in the present disclosure.

The controller 41 controls the general operations of the mobile device 5 and includes, but is not limited to, a central processing unit (CPU), a hardware microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and performing the functions of the mobile device 5 in accordance with the embodiments described in the present disclosure. General communication between the components (e.g., 36-41) of the mobile device 5 is performed using the internal bus 43.

The modem/gateway device 2 is a hardware electronic device that performs the function of a stand-alone cable modem or a combination modem and gateway device that combines the functions of a modem, access point and/or a router for providing content received from the content provider 1 to network devices (e.g., client devices and mobile device) in the system. It is also contemplated by the present disclosure that the modem/gateway device 2 can include the function of, but is not limited to, a Multimedia Adapter (MTA) having a variety of software modules controlling functions of the modem/gateway device 2, and an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content.

As shown in FIG. 2, the modem/gateway device 2 includes a user interface 20, a network interface 21, a power supply 22, a WAN interface 23, a memory 24, and a controller 26. The user interface 20 includes, but is not limited to, one or more physical buttons, one or more virtual buttons, a keyboard, a keypad, a graphical user interface (GUI) an LCD, a CRT, a TFT, an LED, an HD or other similar display device including a display device having touch screen capabilities so as to allow interaction between a user and the modem/gateway device 2. The network interface 21 includes various network cards, and circuitry implemented in software and/or hardware to enable communications with the one or more client device 4 and the one or more mobile device 5 using connection 9.

The various network cards, interfaces, and circuitry of the network interface 21 enable communications using the communication protocols in accordance with connection 9 (e.g., as described with reference to FIG. 1).

For example, by using PuTTY, which is a client program designed for the SSH, telnet and other network protocols, such protocols can be utilized to execute a remote session on a computer or console, such as the mobile device 5, over a network. As a result, in this embodiment of the present disclosure, data such as log data generated and captured by software 25 in the modem/gateway device 2 can be transmitted by, for example, a serial code console connection, from the modem/gateway device 2 to the mobile device 5. The log data can thus be displayed or printed using the user interface 36 of the mobile device 5.

Alternatively, or in addition, log data stored locally on the modem/gateway device 2 can be accessed from, or downloaded from, the modem/gateway des ice 2 by way of the user interface 36 of the mobile device 5 implemented in combination with a graphical user interface (GUI) of the modem/gateway device 2 as will be discussed further in the following description.

The power supply 22 supplies power to the internal components of the modem/gateway device 2 through the internal bus 27. The power supply 22 can be a self-contained power source such as a battery pack with an interface to be powered through an electrical charger connected to an outlet (e.g., either directly or by way of another device). The power supply 22 can also include a rechargeable battery that can be detached allowing for replacement such as a NiCd, a NiMH, a Li-ion, or a Li-pol battery.

The WAN interface 23 may include various network cards, and circuitry implemented in software and/or hardware to enable communications between the gateway device 2 and the ISP 1 using the communication protocols in accordance with connection 13 (e.g., as described with reference to FIG. 1).

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be used to store any type of instructions or software including software 25 associated with algorithms, processes, or operations for controlling the general functions and operations of the modem/gateway device 2 for automatically adjusting a logging level of the modem/gateway device 2 in accordance with the embodiments described in the present disclosure.

The controller 26 controls the general operations of the modem/gateway device 2 and includes, but is not limited to, a CPU, a hardware processor such as a microprocessor, a multi-core processor, a single core processor, a FPGA, a microcontroller, an ASIC, a DSP, or other similar processing device capable of executing any type of instructions, algorithms, or software for controlling the operation and performing the functions of the modem/gateway device 2 in accordance with the embodiments described in the present disclosure. Communication between the components (e.g., 20-24 and 26) of the modem/gateway device 2 is established using the internal bus 27.

Figure 3A:
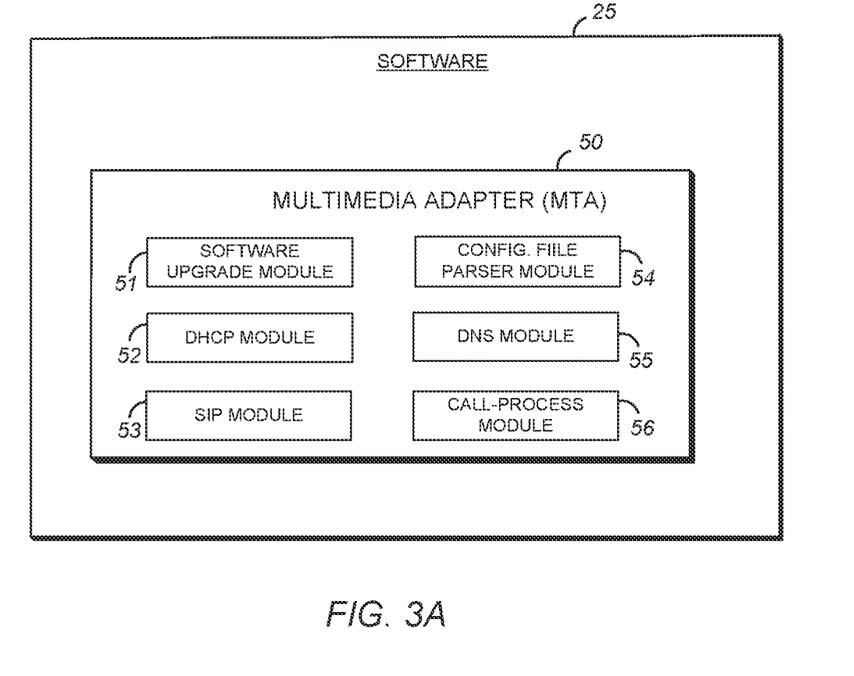
FIG. 3A is an example of the software portion of the modem/gateway device including a Multimedia Adapter (MTA) having various modules according to an embodiment of the present disclosure.

FIG. 3A is an example of the software portion 25 of the modem/gateway device 2 that includes a Multimedia Adapter (MTA) 50 having various software modules according to an embodiment of the present disclosure.

As shown in FIG. 3A, the MTA 50 may include one or more of software modules including, but not limited to, a Software Upgrade Module 51, a Dynamic Host Configuration Protocol (DHCP) Module 52, a Session Initiation Protocol (SIP) Module 53, a Configuration File Parser Module 54, a Domain Name System (DNS) Module 55, and a Call-Process Module 56. The user interface 36 of the mobile device 5 can be implemented in combination with a graphical user interface (GUI) of the modem/gateway device 2 for communicating with the modem/gateway device 2. That is, the user can connect to the GUI of the modem/gateway device 2 using a browser of the mobile device 5 and the address of the modem/gateway device (e.g., http:192.168.0.1). In the alternative, the user can connect to the GUI of the modem/gateway device 2 using software or a mobile application 42 stored in the mobile device 5. Once connected to the modem/gateway device 2, the user of the mobile device 5 can be presented with the virtual buttons or selection options. Various settings and data stored in the memory 24 of the modem/gateway device 2, including logging levels and log data that has been captured in the modem/gateway device 2 after logging has been performed in the modem/gateway device 2, can be manipulated and/or accessed via the above-discussed connection between the mobile device 5 and the GUI of the modem/gateway device 2.

The inventor of the present application has recognized that there are several scenarios that may arise which can cause at least some function of the modem/gateway device 2 to fail. For example, registration of the modem/gateway device 2 may fail, or software upgrade may fail. Either of these failures may result in loss of some or all functionality of the modem/gateway device 2.

Figure 3B:
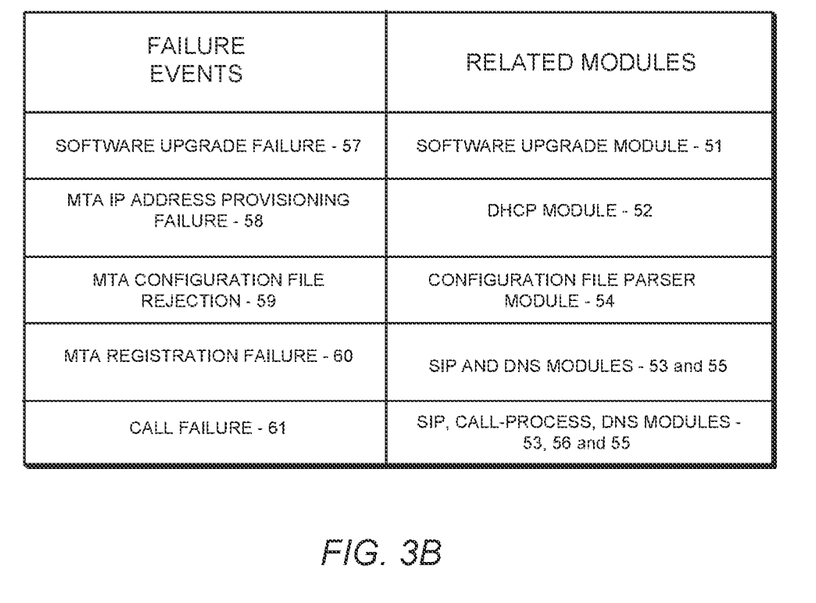
FIG. 3B is an example of a table stored in the software portion of the modem/gateway device showing an example of an association between various events and related modules.

FIG. 3B is an example of a table stored in the software 25 portion of the modem/gateway device 2 showing an example of an association between various failure events and related modules. In FIG. 3B, each of the indicated failure events is a failure that is associated with one or more of the software modules of the MTA 50. While each of these failures may be associated with one or more of the software modules, they are typically not associated with all of the software modules of the MTA.

As shown in FIG. 3B, a software upgrade failure event 57 is associated with the Software Update Module 51 of the MTA 50. An MTA IP address provisioning failure event 58 is associated with the DHCP Module 52 of the MTA 50. An MTA configuration file rejected failure event 59 is associated with the Configuration File Parser Module 54 of the MTA 50. An MTA registration failure event 60 is associated with the SIP Module 53 and the DNS Module 55 of the MTA 50. A call failure event 61 is associated with the SIP Module 53, the Call-Process Module 56, and the DNS Module 55 of the MTA 50.

When the MTA 50 in this embodiment detects one of these failures, the root cause of the failure is likely on the above-discussed one or more modules related to the detected failure. In addition, each of the modules has its own logging level. As a result, it is only necessary to adjust a logging level for a particular module or modules that relate to a detected failure. This is because logging only needs to occur to capture log data for the one or more modules that particularly relate to the detected failure. It is thus not necessary to capture log data for the entire modem/gateway device 2 or even for the entire MTA 50 for that matter.

It would thus be advantageous to provide the user with features to make it possible to troubleshoot an electronic device, such as the modem/gateway device 2 of the above-discussed embodiment, while avoiding data capture of an unnecessarily large amount of logging data during the logging process. Such a feature could improve the user's overall experience with troubleshooting the modem/gateway device while also saving valuable CPU resources.

Also, in each of the scenarios discussed above, the ability to automatically adjust a logging level for an electronic device such as, for example, the modem/gateway device 2, would be particularly advantageous and useful. This would address the above-discussed time consuming issues that exist in conventional arrangements which require a user to first manually enable logging at the DEBUG logging level, manually reproduce or re-create the situation that caused a failure to occur, capture the log data, manually detect that the failure has been resolved, and then manually disable the DEBUG logging level once the failure has been resolved. The automatic adjustment of a logging level of an electronic device of the present application is achieved by first associating in advance each of a plurality of failure events, such as those discussed above and illustrated in the table of FIG. 3B, with one or more related software modules included in the electronic device. For example, the above-discussed one or more software modules, such as those illustrated in FIG. 3A, are associated in advance with respective related failure events as set forth in the foregoing examples. FIG. 3B is an example of a table stored in the software 25 portion of the modem/gateway device 2 showing an example of this type of association between various failure events and related modules.

Figure 4:
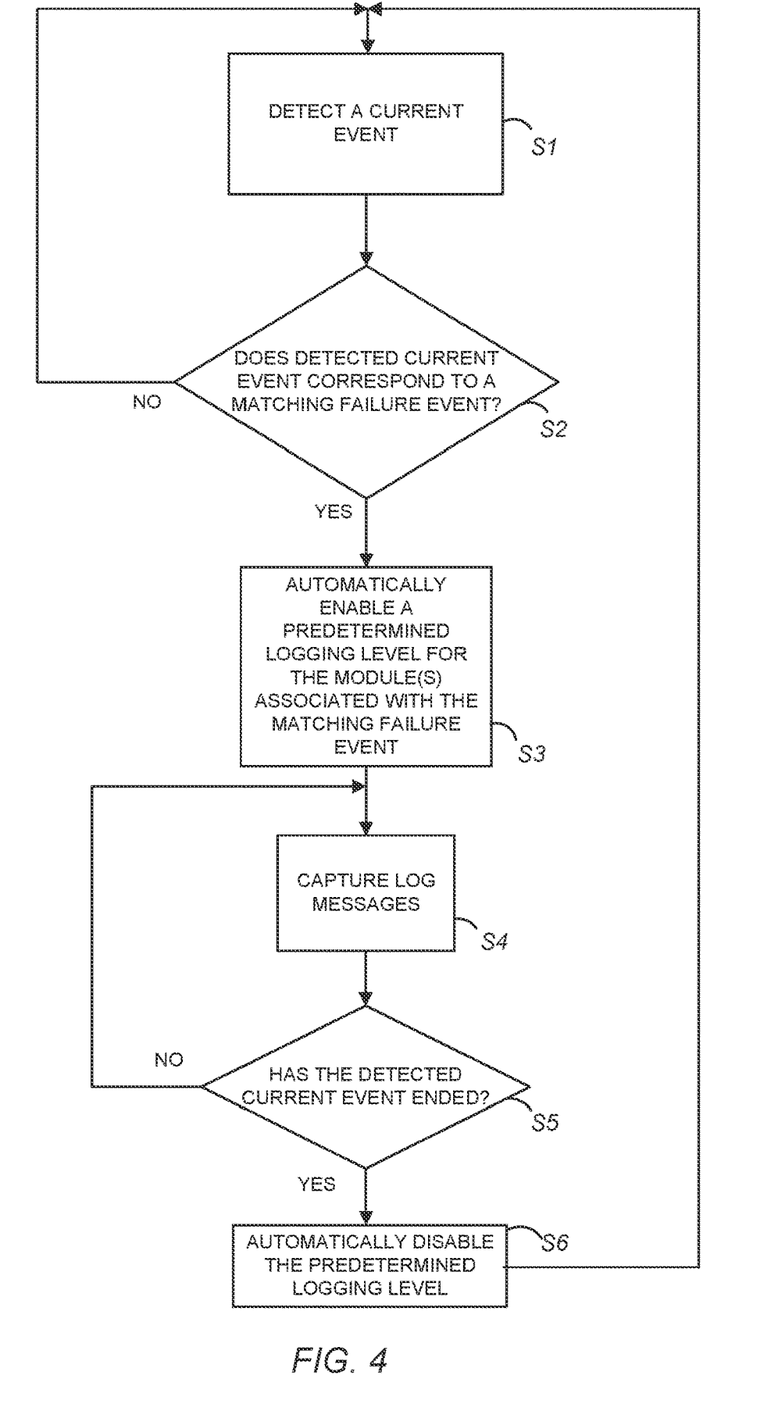
FIG. 4 is method and algorithm for automatically adjusting a logging level of an electronic device according to an embodiment of the present disclosure.

FIG. 4 is method and algorithm for automatically adjusting a logging level of an electronic device according to an embodiment of the present disclosure. In FIG. 4, the method and algorithm illustrate exemplary operations performed by, the example, the software 25 executed by the controller 26 of the modem/gateway device 2 prior to, when, and after the automatic adjustment of a logging level of the electronic device is performed. The method and algorithm of FIG. 4 also illustrate exemplary operations performed by the software or mobile application 42 executed by the controller 41 of the mobile device 5 prior to, when, and after the automatic adjustment of a logging level of the electronic device is performed.

As noted previously, the user can connect to the GUI of the modem/gateway device 2 using a browser of the mobile device 5 and the address of the modem/gateway device (e.g., http:192.168.0.1). In the alterative, the user can connect to the GUI of the modem/gateway device 2 using software or a mobile application 42 stored in the mobile device 5. Once connected to the modem/gateway device 2, the user of the mobile device 5 can be presented with the GUI of the modem/gateway device 2 for changing settings of the modem/gateway device 2. The GUI may be, for example, 30-40 pages long which provides a user an opportunity to implement a wide variety of user-specific configurations via personalized user settings that are input by a user via the GUI of the user interface 20 of the modem/gateway device 2.

Using this GUI, a user is able to set numerous personalized user settings according to their own specific needs. For example, the user can select, among other personal device user settings, a current WiFi SSID and password. Other personal device user settings that can be set on the GUI include, but are not limited to, enabling and disabling or one or more logging levels, parental controls, accessible via a Parental Control tab in an example, firewall levels, accessible via a Firewall tab in an example, the ability to block certain devices from accessing the Internet, setup of special message channels for specific software, and other security and configuration settings for the modem/gateway device 2.

Thus, the device settings included in the GUI for the modem/gateway device 2 includes both manufacturer or default settings as well as one or more user settings that have been personalized by a user of the modem/gateway device 2 and have been input from the GUI of the user interface of the modem/gateway device 2 as per the foregoing discussion.

In step S1, a current event taking place with regard to the operation of the modem/gateway device 2 is detected by software 25 in the modem/gateway device 2.

In step S2, a determination is made by the software 25 of the modem/gateway device 2 as to whether the detected current event corresponds to a matching failure event of the plurality of failure events that have been associated in advance with one or more software modules included in the modem/gateway device 2. For example, a determination is made as to whether or not the detected current event corresponds to one of the failure events 57-61 shown in the left side portion of the table of FIG. 3B. If not, the software 25 continues to monitor for other current events as they occur in step S1.

If such a determination is made in step S2, the software 25 will automatically enable a predetermined logging level for the one or more of the software modules associated with the matching failure event at the time of the current event in step S3. In an embodiment of the present disclosure, the predetermined logging level is a DEBUG level. For example, if an MTA registration failure event 60 occurs on the modem/gateway device 2, it will typically retry a number of times in the conventional arrangements. In an embodiment of the present disclosure, the software 25 will automatically enable the DEBUG logging level after the initial detection of an MTA registration failure 60 and before any such retries occur. Thus, a user does not need to manually detect that the MTA registration failure event 60 has occurred and the user does not need to manually enable the DEBUG logging level after the detection of the MTA registration failure 60. This arrangement and methodology of the present application thus saves a significant amount of time in the overall troubleshooting process.

Also, in step S3, an embodiment of the present disclosure involves enabling only the logging level for the one or more of the software modules associated with the matching failure event at the time of the current event. For example, the DEBUG logging level is enabled for only the one or more modules associated with the error that has occurred. It is not necessary to enable the DEBUG logging level for the other modules in this example and they will not be affected. This arrangement and methodology thus assists in avoiding the problem in conventional arrangements and methodologies of capturing too many log entries because only log entries associated with an error or failure of a current event are captured.

Also, in an embodiment of the present disclosure, the predetermined logging level is disabled on all of the software modules of the electronic device as an initial default setting prior to the detected current event. This allows a lower logging level to be set as a default to further assist in avoiding the above-discussed issues with conventional arrangements and methodologies in which too many data entries are generated and captured in an electronic device.

In addition, in an embodiment of the present disclosure, one or more default logging levels remain enabled on all of the software modules of the electronic device regardless of whether the predetermined logging level is disabled or enabled for any particular software module(s). For example, in an embodiment where the predetermined logging level is DEBUG, one or more default logging levels from the INFO, WARNING, ERROR and FATAL logging levels will remain enabled regardless of whether the DEBUG logging level is enabled or disabled.

Once the predetermined logging level is enabled in step S3, log messages are captured by the software 25 and stored in the memory 24 in step S4. In this regard, for example, log messages are captured for only the one or more of the software modules for which the predetermined logging level has been automatically enabled in step S3.

In step S5, a determination is made by the software 25 of the modem/gateway device 2 as to whether the detected current event has ended. In other words, it is determined whether the detected current event which corresponds to a matching failure event has ended so that the associated failure or error of the current event has been recovered or resolved. If not, the software 25 will continue to capture the associated log messages in step S4.

If a determination is made in step S5 that the detected current event has ended, the software 25 of the modem/gateway device 2 in step S6 will automatically disable the predetermined logging level that was enabled in step S3. In other words, it is no longer necessary to capture log data at the predetermined logging level because the issue, such as a failure or error, for example, associated with the detected current event has been resolved. For example, if the MTA registration is determined to have completed properly, the DEBUG logging level is automatically disabled on the associated SIP and DNS modules 53 and 55. This results in advantageously avoiding the above-discussed issue of too much log data being captured when it is no longer necessary as the associated issue has been resolved and no longer needs to be troubleshooted. The process flow of the software 25 will then return to step S1 so that another current event can be detected.

Using the methods and algorithms for automatically adjusting a logging level of an electronic device discussed above, a detected current event associated with operation of an electronic device is checked to see if it corresponds to any of a plurality of failure events that each have been associated in advance with one or more software modules which control functions of the electronic device. If the detected current event does correspond to a matching failure event, a predetermined logging level is automatically enabled for only the one or more software modules associated with the matching failure event at the time of the detected current event.

This arrangement and methodology of the present application advantageously limits the amount of log data that will be captured in that only log data of the related one or more modules associated with the matching failure event will be captured. As a result, the above-discussed problems of conventional arrangements and methodologies of providing a user with an unnecessarily large amount of logging data can be avoided. The user's overall experience with troubleshooting the electronic device is thus improved while also saving valuable, costly, and sometimes limited CPU resources.

In addition, using the methods and algorithms for automatically adjusting a logging level of an electronic device discussed above, a predetermined logging level is automatically enabled for the one or more software modules associated with a matching failure event at the time of a detected current event. In addition, the predetermined logging level is automatically disabled when it is detected that the current event has ended.

Thus, if the electronic device detects a predetermined failure, the root cause of the failure is understood to be on the related one or more software modules. For improved and efficient trouble shooting, log data is captured on only the related one or more software modules. Accordingly, a higher logging level such as the DEBUG logging level, for example, is turned on automatically only for the related one or more software modules at the time of a detected failure of operation of at least some portion of the electronic device. When the failure is recovered, the DEBUG logging level, for example, is automatically disabled and the electronic device is automatically returned to its default lower logging level.

As a result of the above-discussed automatic adjusting, or configuration, of a logging level, the above-discussed problems of conventional arrangements and methodologies can be avoided. As a result, the user no longer needs to perform the time consuming procedure of manually enabling logging at the DEBUG logging level, manually reproducing or re-creating the situation that initially caused the error or failure of the electronic device to occur before capturing log data, manually detecting that the failure has been resolved, and then manually disabling the DEBUG logging level to avoid continued logging of a large amount of log data when it is no longer needed. The user's overall experience with troubleshooting the electronic device is thus improved while also reducing the amount of time required to perform the troubleshooting process.

The present disclosure may be implemented as any combination of an apparatus, a system, an integrated circuit, and a computer program on a non-transitory computer readable recording medium. The one or more processors may be implemented as an integrated circuit (IC), an application specific integrated circuit (ASIC), or large scale integrated circuit (LSI), system LSI, super LSI, or ultra LSI components that perform a part or all of the features of the embodiments described in the present disclosure.

The present disclosure includes the use of software, applications, computer programs, or algorithms. The software, applications, computer programs, or algorithms can be stored on a non-transitory computer-readable medium for causing a computer, such as the one or more processors, to execute the steps described in FIG. 4. For example, the one or more memories stores software or algorithms with executable instructions and the one or more processors can execute a set of instructions of the software or algorithms in association the performing the features of the embodiments described in the present disclosure.

The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features of the embodiments described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

I claim:

1. An electronic device capable of automatically adjusting a logging level comprising:
   a hardware processor; and
   a non-transitory memory configured to store one or more programs including a plurality of software modules, each software module controlling functions of the electronic device,
   wherein the hardware processor executes the one or more programs to:
   associate in advance each of a plurality of failure events with one or more of the software modules;
   detect a current event on the electronic ice that corresponds to a matching failure event of the plurality of failure events;
   automatically enable a predetermined logging level for the one or more of the software modules associated with the matching failure event at the time of the detected current event;
   capture log messages for the one or more of the software modules for which the predetermined logging level has been automatically enabled; and
   automatically disable the predetermined logging level when it is detected that the current event has ended.

2. The electronic ice according to claim 1, wherein the predetermined logging level is a DEBUG level.

3. The electronic device according to claim 1, wherein the predetermined logging level is disabled as an initial default setting prior to the detected current event.

4. The electronic device according to claim 1, wherein one or more default logging levels remain enabled regardless of whether the predetermined logging level is disabled or enabled.

5. The electronic device according to claim 1, wherein the electronic device is a modem/gateway wireless device.

6. The electronic device according to claim 5, wherein the modem/gateway wireless device includes a Multimedia Adapter (MTA).

7. The electronic device according to claim 6, wherein the plurality of software modules include one or more of a software upgrade module, a Dynamic Host Configuration Protocol (DHCP) module, a configuration file parser module, an Session Initiation Protocol (SIP) module, a Domain Name System (DNS) module, and a Call-Process module.

8. A method for automatically adjusting a logging level for an electronic device having a plurality of software modules, each software module controlling functions of the electronic device, the method comprising:
   associating in advance each of a plurality of failure events with one or more of the software modules;
   detecting a current event on the electronic device that corresponds to a matching failure of the plurality of failure events;

automatically enabling a predetermined logging level for the one or more of the software modules associated with the matching failure event at the time of the detected current event;

capturing log messages for the one or more of the software modules for which the predetermined logging level has been automatically enabled; and automatically disabling the predetermined logging level when it is detected that the current event has ended.

9. The method according to claim 8, wherein the predetermined logging level is a DEBUG level.

10. The method according to claim 8, wherein the predetermined logging level is disabled as an initial default setting prior to the detected current event.

11. The method according to claim 8, wherein one or more default logging levels remain enabled regardless of whether the predetermined logging level is disabled or enabled.

12. The method according to claim 8, wherein the electronic device is a modem/gateway wireless device.

13. The method according to claim 12, wherein the modem/gateway wireless device includes a Multimedia Adapter (MTA).

14. The method according to claim 13, wherein the plurality of software modules include one or more of a software upgrade module, a Dynamic Host Configuration Protocol (DHCP) module, a configuration file parser module, an Session Initiation Protocol (SIP) module, a Domain Name System (DNS) module, and a Call-Process module.

15. A non-transitory computer-readable recording medium automatically adjusting a logging level for an electronic device having a plurality of software modules, each software module controlling functions of the electronic device, the non-transitory computer-readable recording medium storing one or more programs which when executed by a hardware processor performs steps comprising:

associating in advance each of a plurality of failure events with one or more of the software modules;

detecting a current event on the electronic device that corresponds to a matching failure event of the plurality of failure events;

automatically enabling a predetermined logging level for the one or more of the software modules associated with the matching failure event at the time of the detected current event;

capturing log messages for the one or more of the software modules for which the predetermined logging level has been automatically enabled; and automatically disabling the predetermined logging level when it is detected that the current event has ended.

16. The non-transitory computer-readable recording medium according to claim 15, wherein the predetermined logging level is a DEBUG level.

17. The non-transitory computer-readable recording medium according to claim 15, wherein the predetermined logging level is disabled as an initial default setting prior to the detected current event.

18. The non-transitory computer-readable recording medium according to claim 15, wherein the electronic device is a modem/gateway wireless device.

19. The non-transitory computer-readable recording medium according to claim 18, wherein the modem/gateway wireless device includes a Multimedia Adapter (MTA).

20. The non-transitory computer-readable recording medium according to claim 19, wherein the plurality of software modules include one or more of a software upgrade module, a Dynamic Host Configuration Protocol (DHCP) module, a configuration file parser module, an Session initiation Protocol (SIP) module, a Domain Name System (DNS) module, and a Call-Process module.

* * * * *